(12) United States Patent
Hughes

(10) Patent No.: US 11,083,140 B1
(45) Date of Patent: Aug. 10, 2021

(54) GROW LIGHT SYSTEM AND METHOD

(71) Applicant: Lee S. Hughes, Columbus, OH (US)

(72) Inventor: Lee S. Hughes, Columbus, OH (US)

( * ) Notice: Subject to any disclaimer, the term of this patent is extended or adjusted under 35 U.S.C. 154(b) by 526 days.

(21) Appl. No.: 16/191,393

(22) Filed: Nov. 14, 2018

Related U.S. Application Data

(60) Provisional application No. 62/586,131, filed on Nov. 14, 2017.

(51) Int. Cl.
*A01G 7/04* (2006.01)
*H05B 45/10* (2020.01)
*H05B 45/20* (2020.01)
*H05B 47/155* (2020.01)

(52) U.S. Cl.
CPC .............. *A01G 7/045* (2013.01); *H05B 45/10* (2020.01); *H05B 45/20* (2020.01); *H05B 47/155* (2020.01)

(58) Field of Classification Search
CPC ............................... A01G 7/045; H05B 47/155
See application file for complete search history.

(56) References Cited

U.S. PATENT DOCUMENTS

| | | | | |
|---|---|---|---|---|
| 2013/0134880 A1* | 5/2013 | Rea | ......................... | A01G 9/249 315/112 |
| 2015/0181811 A1* | 7/2015 | Krijn | ..................... | F21V 23/001 47/58.1 LS |
| 2016/0353671 A1* | 12/2016 | Shaughnessy | ....... | A61K 36/185 |
| 2017/0142910 A1* | 5/2017 | Johnson | ............. | G02B 19/0066 |
| 2017/0192154 A1* | 7/2017 | Gilley | .................... | A01G 9/249 |
| 2020/0053854 A1* | 2/2020 | Xu | ........................ | G02B 6/0053 |

* cited by examiner

*Primary Examiner* — Monica L Barlow
(74) *Attorney, Agent, or Firm* — Robert R. Lech; Lech Law, LLC

(57) ABSTRACT

A light system is disclosed for providing a light for cultivating plants. The light system comprises: a) a lighting hood assembly structure for supporting components of the system; b) one or more fluorescent bulbs operably positioned within the recessed space; c) one or more high intensity discharge bulbs positioned at the upper lighting surface; d) a plurality of red LED lights lined about the lower lighting perimeter, wherein the red LED's are oriented in opposing northern and southern strips and opposing eastern and western strips forming a rectangular pattern; e) a plurality of white LED lights lined about the lower lighting perimeter; f) a plurality of blue LED lights lined about the lower lighting perimeter; g) a fan operably positioned within a side wall of the lighting hood for removing heat from the recessed interior; h) a primary electrical power source providing 120-volt electrical power; i) a battery operably configured to power the LED lights; j) a battery charger which is operably configured to charge battery by way of primary electrical source; k) an on-board computer configured to operate and control a lighting sequence of the lights in a coordinated manner.

3 Claims, 13 Drawing Sheets

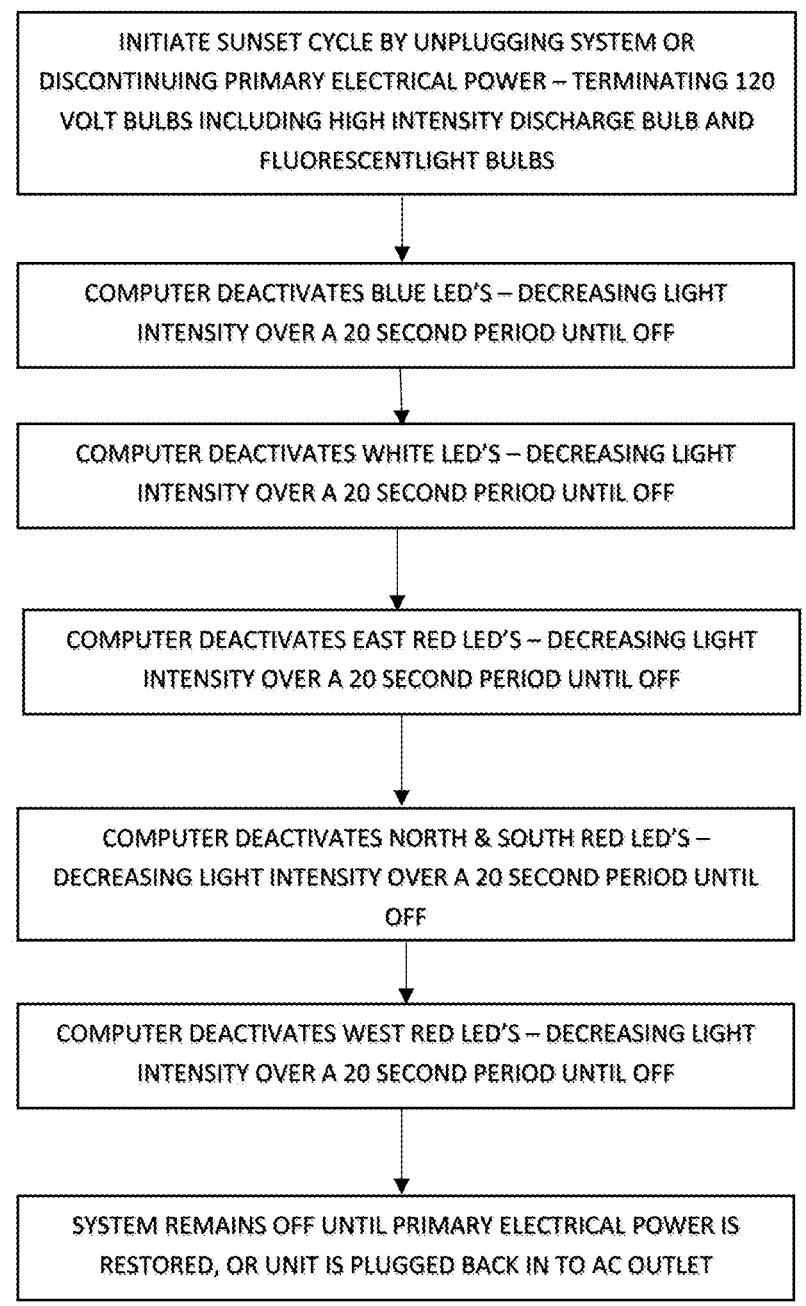

GROW LIGHT SYSTEM AND METHOD

CROSS-REFERENCE TO RELATED APPLICATIONS

This application claims priority to U.S. Provisional Patent Application Ser. No. 62/586,131 filed Nov. 14, 2017 entitled "Grow Light System and Method," which is incorporated by reference in its entirety as if fully set forth herein.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

INCORPORATION BY REFERENCE OF MATERIAL SUBMITTED ON A COMPACT DISK

Not Applicable.

BACKGROUND

The present invention relates generally to a self-contained grow light system and method simulating the natural change in light spectrum throughout the day, particularly during sunrise and sunset.

SUMMARY

These and other features of the present invention will become readily apparent upon further review of the following specification and drawings.

In a version of the application, a light system for providing light for cultivating plants generally comprises: a lighting hood assembly structure for supporting components of the system, wherein the hood assembly structure comprises: (i) a recessed interior space having an upper lighting region and a lower lighting perimeter positioned lower and lateral relative to the upper lighting surface; and (ii) wherein the recessed interior space comprises a reflective material angled downward between the upper lighting region and lower lighting surfaces; one or more fluorescent bulbs operably positioned within the recessed space; one or more high intensity discharge bulbs positioned at the upper lighting surface; a plurality of red LED lights lined about the lower lighting perimeter, wherein the red LED's are oriented in opposing northern and southern strips and opposing eastern and western strips forming a rectangular pattern; a plurality of white LED lights lined about the lower lighting perimeter; a plurality of blue LED lights lined about the lower lighting perimeter; a fan operably positioned within a side wall of the lighting hood for removing heat from the recessed interior; a primary electrical power source providing 120-volt electrical power; a battery operably configured to power the LED lights; a battery charger which is operably configured to charge battery by way of primary electrical source; and an on-board computer configured to operate and control a lighting sequence of the lights in a coordinated manner, the computer comprising a computer processor and non-transitory computer readable storage media encoded with a computer program including instructions executable by the computer processor to create a computer application comprising: a software module configured to simulate the lighting spectrum of a sunrise; a software module configured to simulate daytime lighting spectrum; and a software module configured to simulate the lighting spectrum of a sunset.

In a version, the software module configured to simulate the lighting spectrum of a sunrise provides the following lighting sequence: system is powered on by providing a source of electricity; computer activates blue LED's by increasing light intensity over a 20 second period until fully activated; computer activates white LED's by increasing light intensity over a 20 second period until fully activated; computer activates high intensity discharge bulb providing a 20 second delay after the bulb is fully activated; computer activates one or more fluorescent bulbs providing a 20 second delay after the bulb is fully activated; computer activates northern and southern red LED's by increasing light intensity over a 20 second period until fully activated; computer operates to maintain current light activation for approximately 60 minutes; computer activates eastern and southern red LED's by increasing the light intensity over a 20 second period until fully activated; and lights remain operational until source of electricity is terminated.

In a version, the software module configured to simulate the lighting spectrum of a sunset provides the following lighting sequence: primary electrical power source is discontinued, terminating operation of high intensity bulbs and fluorescent bulbs; system is operated by way of battery power; computer deactivates blue LED's by decreasing light intensity over a 20 second period until lights are off; computer deactivates white LED's by decreasing light intensity over a 20 second period until lights are off; computer deactivates eastern red LED's by decreasing light intensity over a 20 second period until lights are off; computer deactivates northern and southern red LED's by decreasing light intensity over a 20 second period until the lights are off; computer deactivates western red LED's by decreasing light intensity over a 20 second period until lights are off; and lights remain off until primary electrical power source is restored initiating the sunrise phase.

BRIEF DESCRIPTION OF THE DRAWINGS

These and other features, aspects, and advantages of the present invention will become better understood with regard to the following description and accompanying figures where:

FIG. 19 is a flow chart illustrating the steps of the sunset phase.

DETAILED DESCRIPTION

Figure 1:
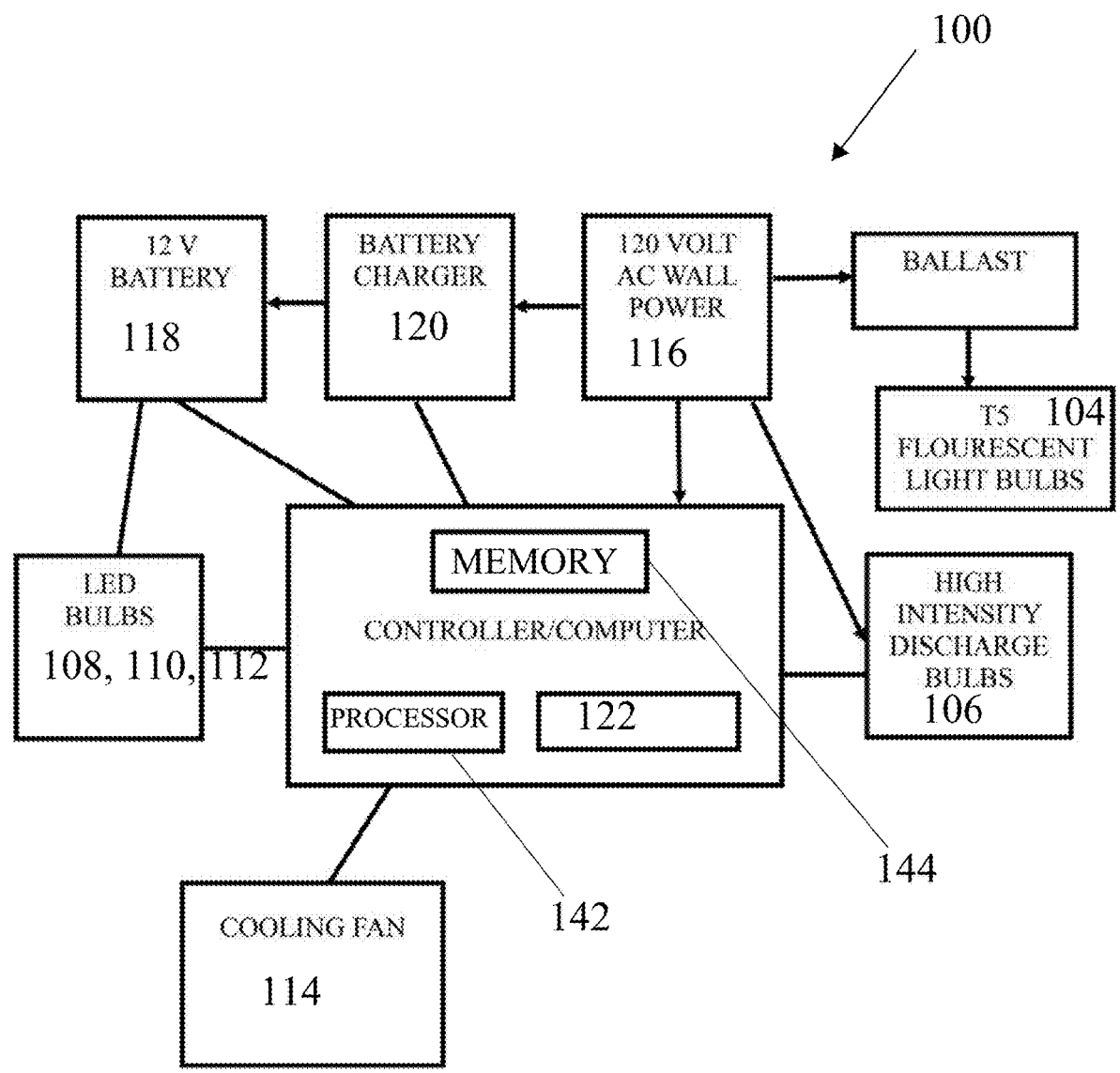
FIG. 1 is a block diagram illustrating the major components of the light system.
Figure 2:
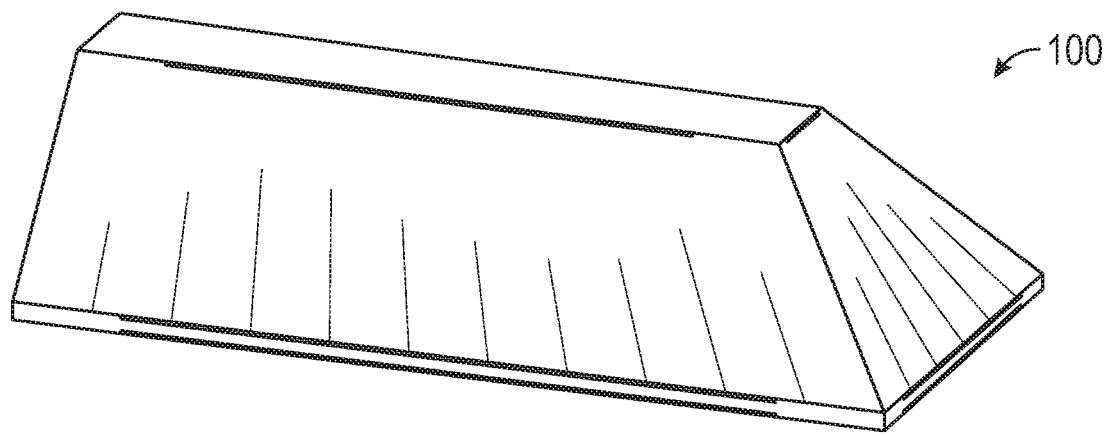
FIG. 2 is a top, front perspective view of a version of the light system.
Figure 3:
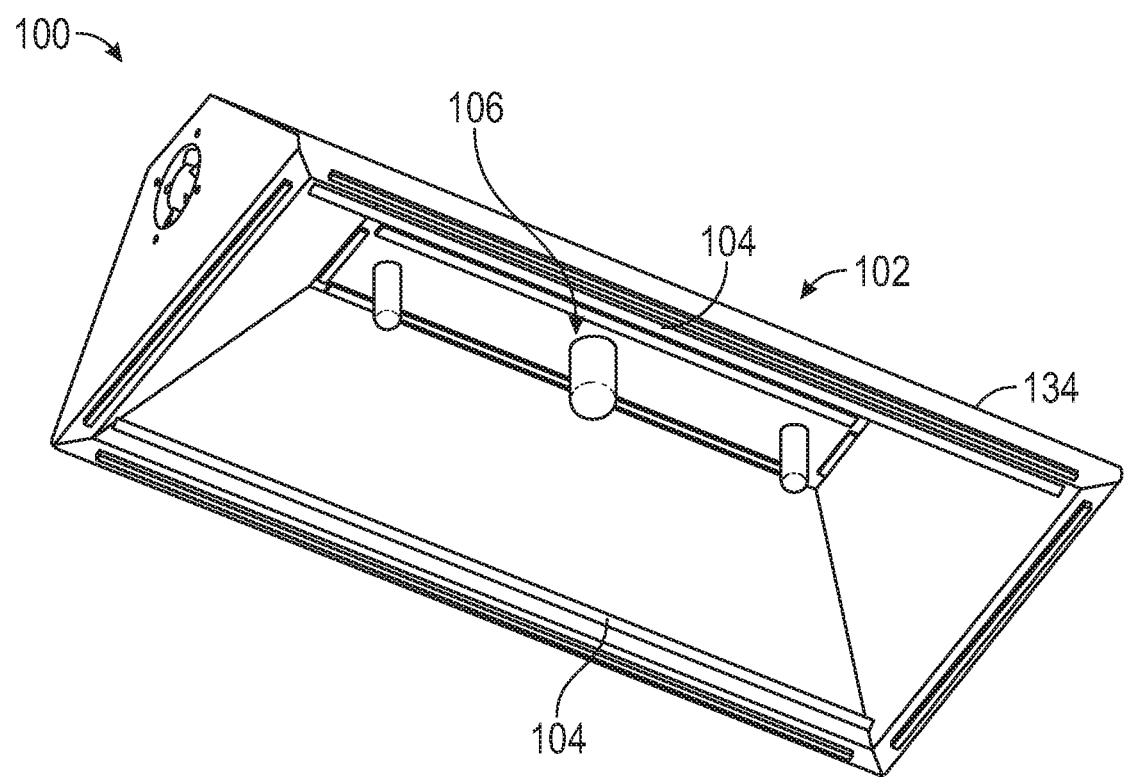
FIG. 3 is a bottom perspective view of the version shown in FIG. 1.
Figure 4:
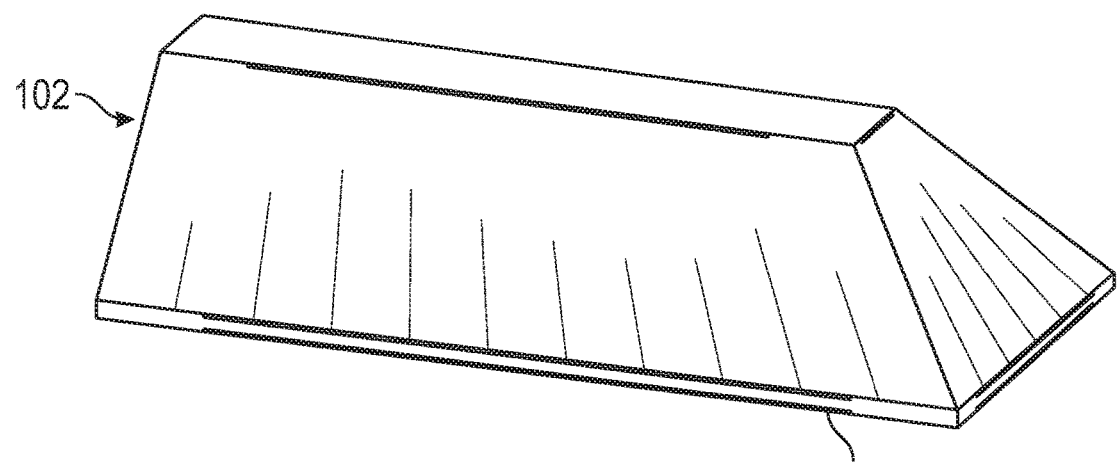
FIG. 4 is a top, front perspective view of the version shown in FIG. 1.

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other versions that depart from these specific details. In other instances, detailed descriptions of well-known devices, circuits, and methods are omitted so as not to obscure the description of the present invention with unnecessary detail.

Moreover, the description is not to be taken in the limiting sense, but is made merely for the purpose illustrating the general principles of the invention, since the scope of the invention is best defined by the appended claims. Various inventive features are described below that can each be used independently of one another or in combination with other features.

Unless otherwise defined, all technical terms used herein have the same meaning as commonly understood by one of ordinary skill in the art to which the invention belongs. As used in the specification and the appended claims, the singular forms "a," "an," and "the" include plural references unless the context clearly dictates otherwise. Any reference to "or" herein is intended to encompass "and/or" unless otherwise stated.

By way of overview and in certain aspects as described herein are platforms, systems, methods, and computer readable media which provide a fully automated grow light which simulates phases of sunrise, daylight, and sunset by way of a plurality of LED lights and hereinafter described for simplicity as the light system 100. Preferably, the light system 100 will be suited to provide light and cultivate medicinal plants such as *cannabis*; however, it may be suited to grow all types of plant including food, herbs, flowers, etc.

Further in overview, the light system 100 is generally configured to provide an all-in-one, self-contained light fixture which fades various colors of light bulbs to simulate that natural lighting spectrum throughout a sunlit day. Namely, the system 100 provides a spectrum emphasizing blue tones while simulating a sunrise and red tones while simulating a sunset.

In certain aspects as of a version of the light system 100 as illustrated by FIG. 1-FIG. 12, the light system 100 may generally comprise a lighting hood assembly 102 for supporting the components of the system 100 and directing light downward, one or more fluorescent bulbs 104, one or more high intensity discharge bulbs 106, a plurality of red 108, white 110, and blue 112 LED lights, a fan 114 for removing heat, a primary electrical power source 116, a battery 118 for providing 12 volt power to the LED lights, a battery charger 120 which is operably configured to charge the battery by way of the primary electrical source 116; an on-board computer 122 having a processor and memory for operating the light system 100 components collectively and for providing algorithmic calculations to control and coordinate the lighting to simulate sunrise, daylight, and sunset light spectrums Now referring to the FIG. 1-FIG. 12, a version of the light system 100 comprises a hood assembly structure 102 for supporting the components of the system and is operably configured to direct light from the lights downward towards a subject plant. In the version, the hood assembly 102 structure comprises a recessed interior space 124 formed by a first and second ends sides 126, 128 and opposing front and back sides 130, 132 forming a rectangular opening having a lower lighting perimeter 134. The recessed interior space 124 having an upper lighting surface 136, wherein the upper lighting surface 136 positioned strategically above the lower lighting perimeter 134. Ideally, the surfaces of the recessed interior space 124 are made of a light reflective material for maximizing light projection downward towards the subject plant. For example, a hammered aluminum can be utilized to provide a reflective material.

Figure 5:
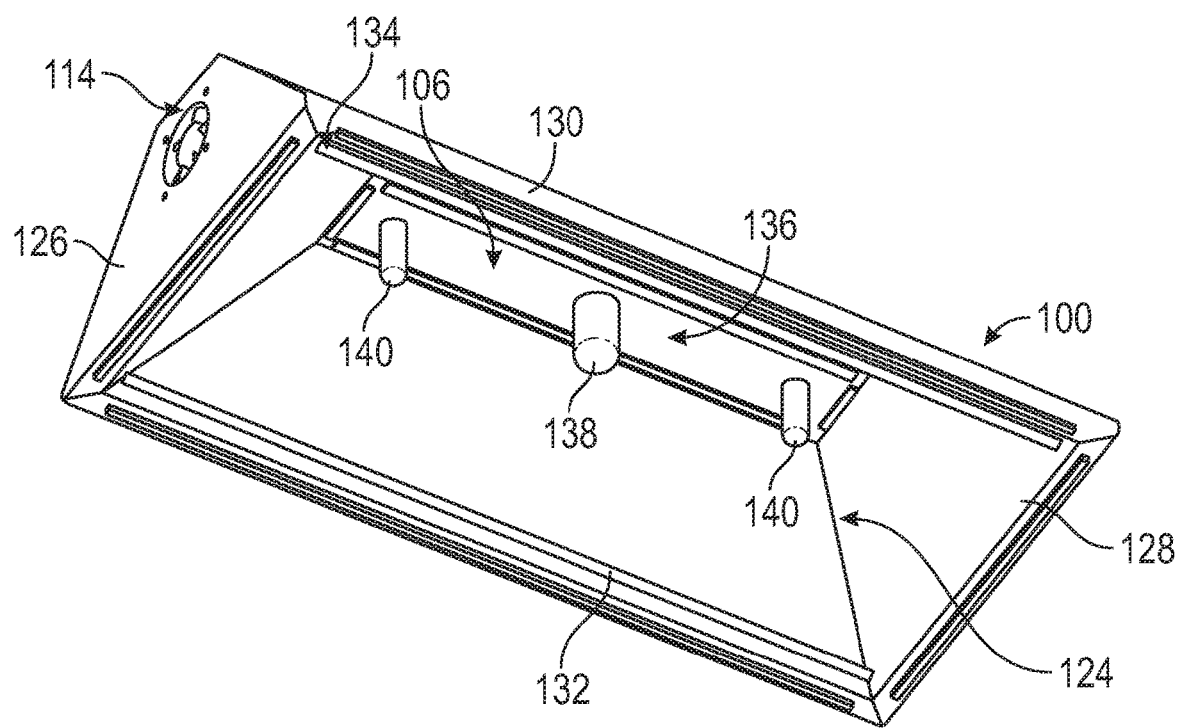
FIG. 5 is a bottom perspective view of the version shown in FIG. 1.
Figure 7:
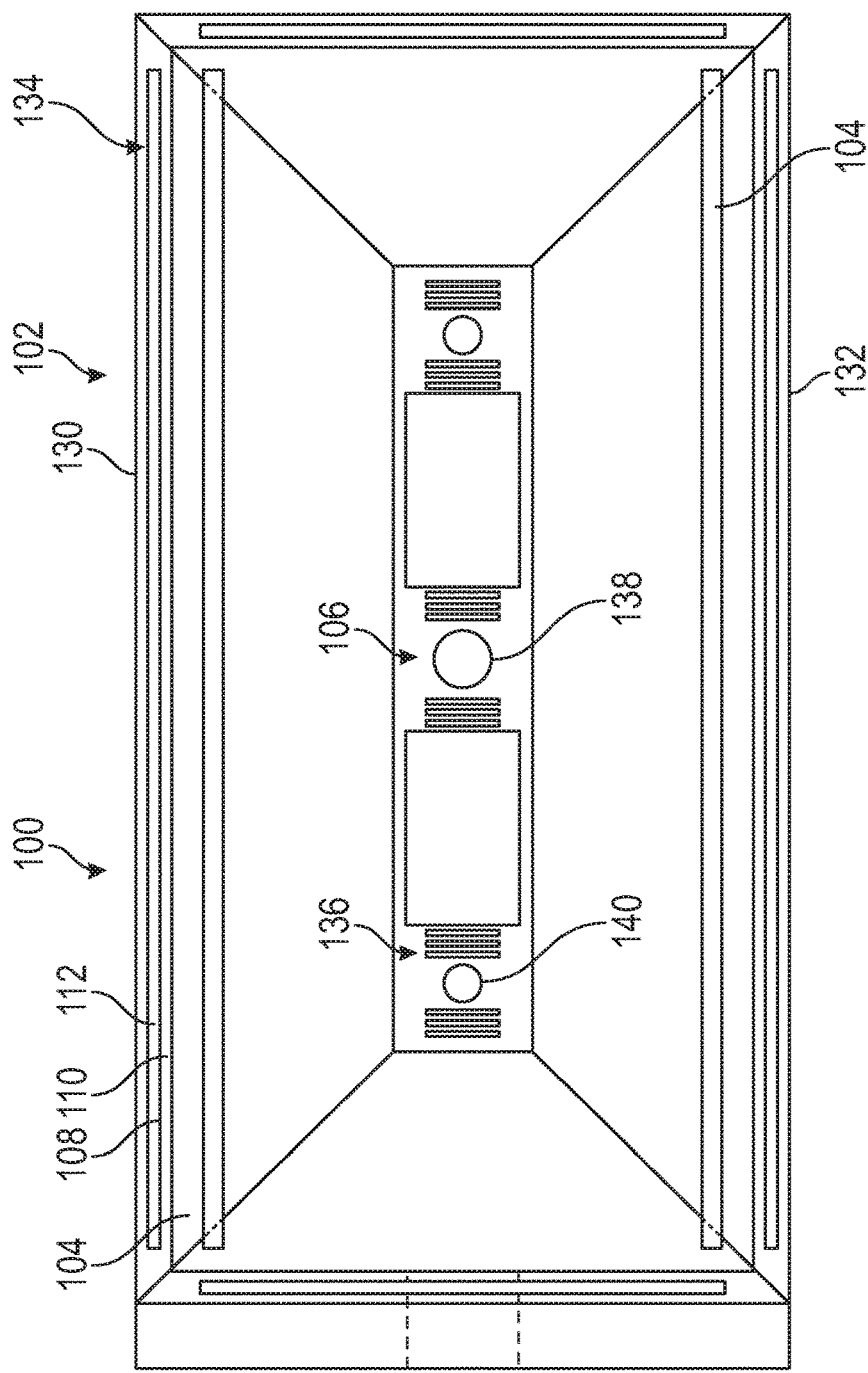
FIG. 7 is a bottom plan view of the version shown in FIG. 1.
Figure 6:
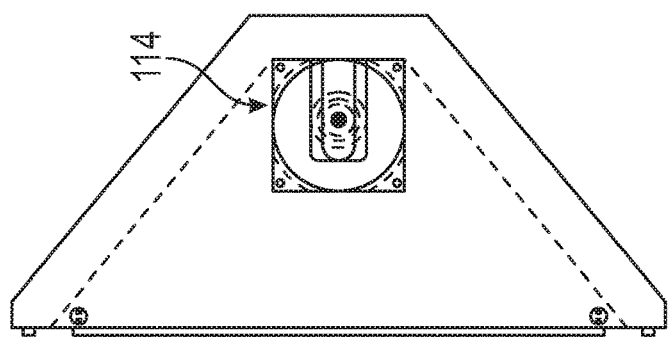
FIG. 6 is a right-side elevation view of the version shown in FIG. 1.
Figure 8:
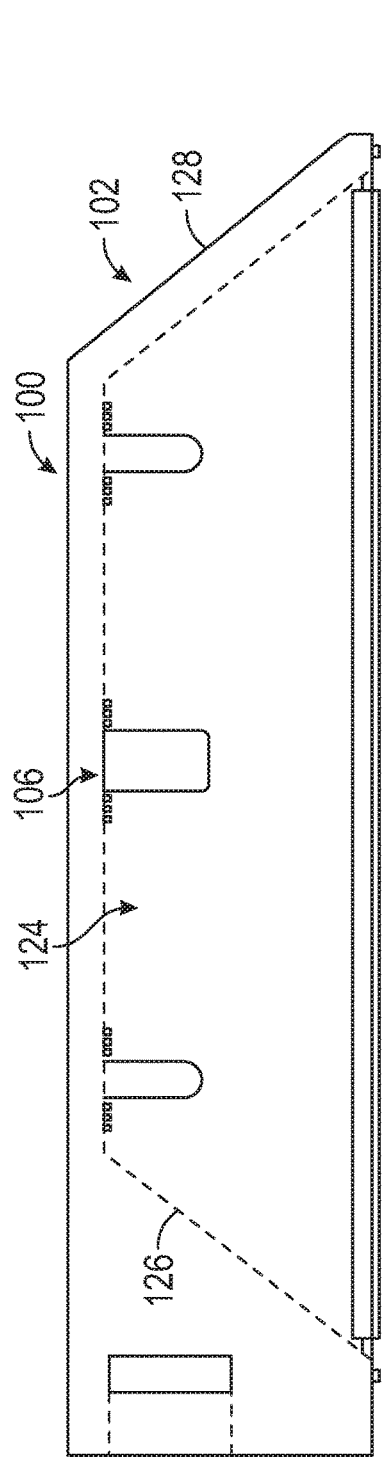
FIG. 8 is a front elevation view of the version shown in FIG. 1.

In the illustrated version as best illustrated by FIG. 5 and FIG. 7, the one or more fluorescent bulbs 104 are positioned along the length of the front and back lower lighting perimeters 134. In the version, two fluorescent bulbs are utilized.

In the version, the one or more high intensity bulbs 106 are positioned at the upper lighting region 136. In the version, a 315-watt Ceramic Metal Halide bulb CMH 138 is positioned at the center of the upper lighting region 136. Laterally to each side of the CMH 138 is a High-Pressure Sodium HPS bulb 140 in order to provide a broad spectrum of light simulating daylight.

Generally speaking, the primary electrical source 116 is operably configured to provide electrical power to both the fluorescent bulbs 104 and the high intensity discharge bulbs 106 and provides power to the battery charger 120, battery 118, and the on-board computer 122. The battery is operably configured to provide 12-volt power to the LED's throughout operation.

Figure 9:
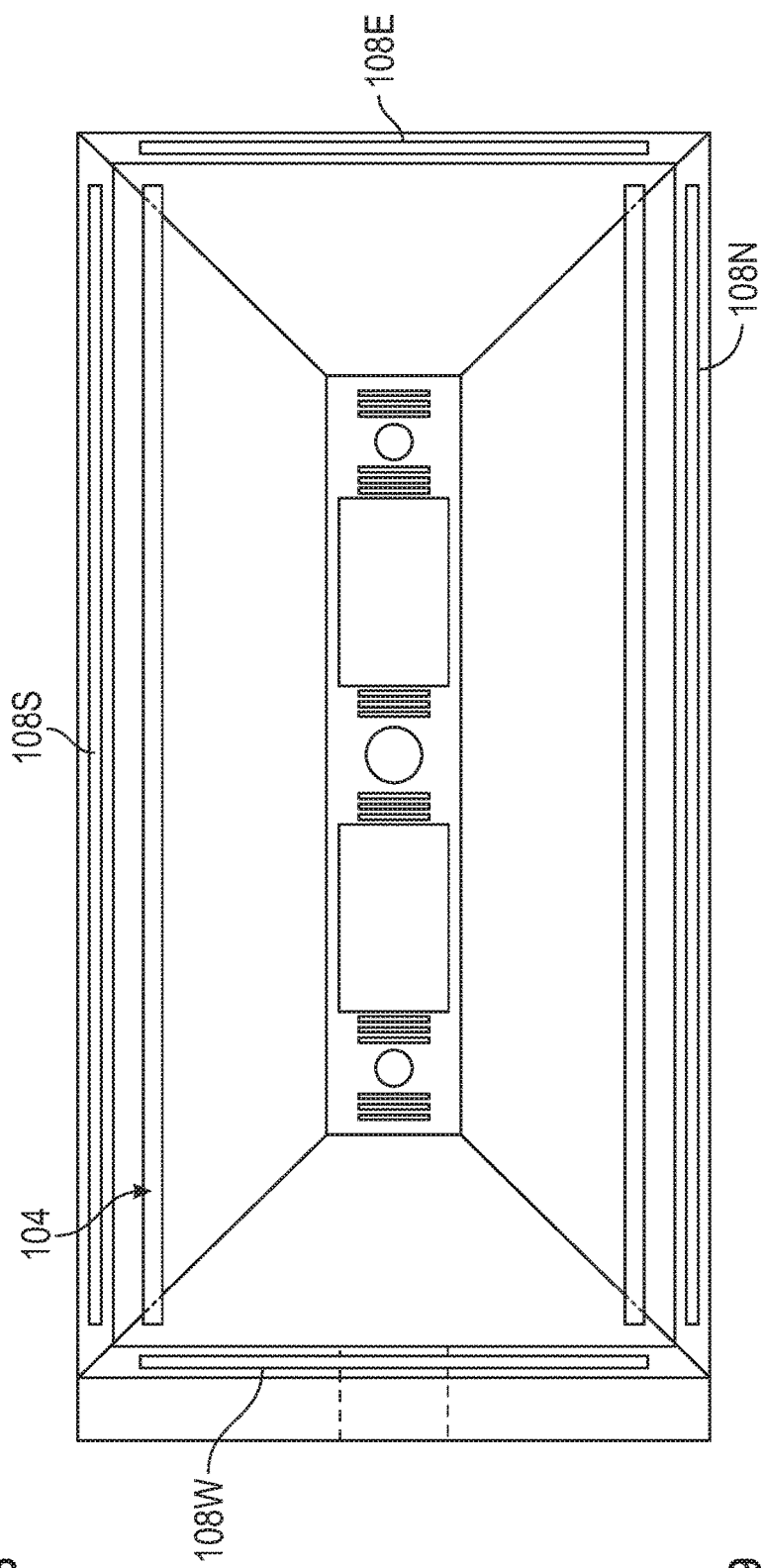
FIG. 9 is a bottom plan view of the version shown in FIG. 1.
Figure 10:
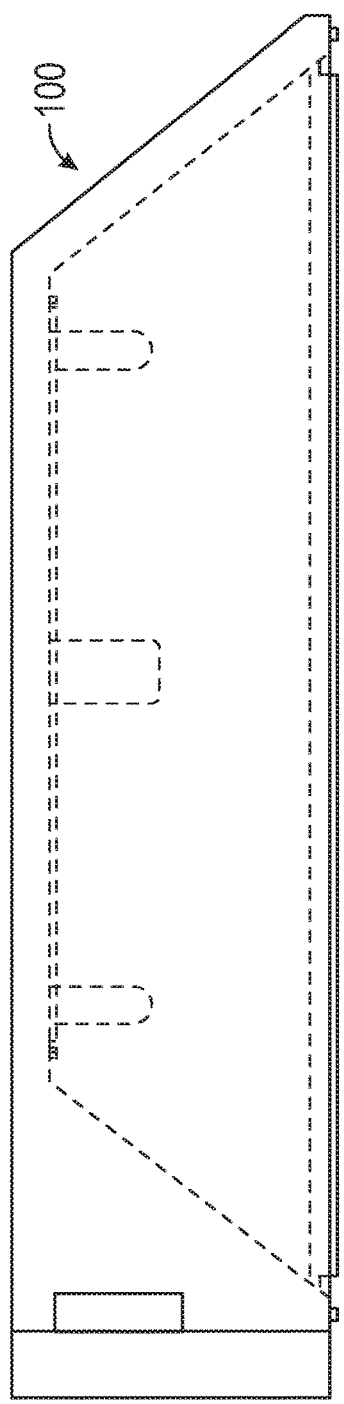
FIG. 10 is a front elevation view of the version shown in FIG. 1.
Figure 11:
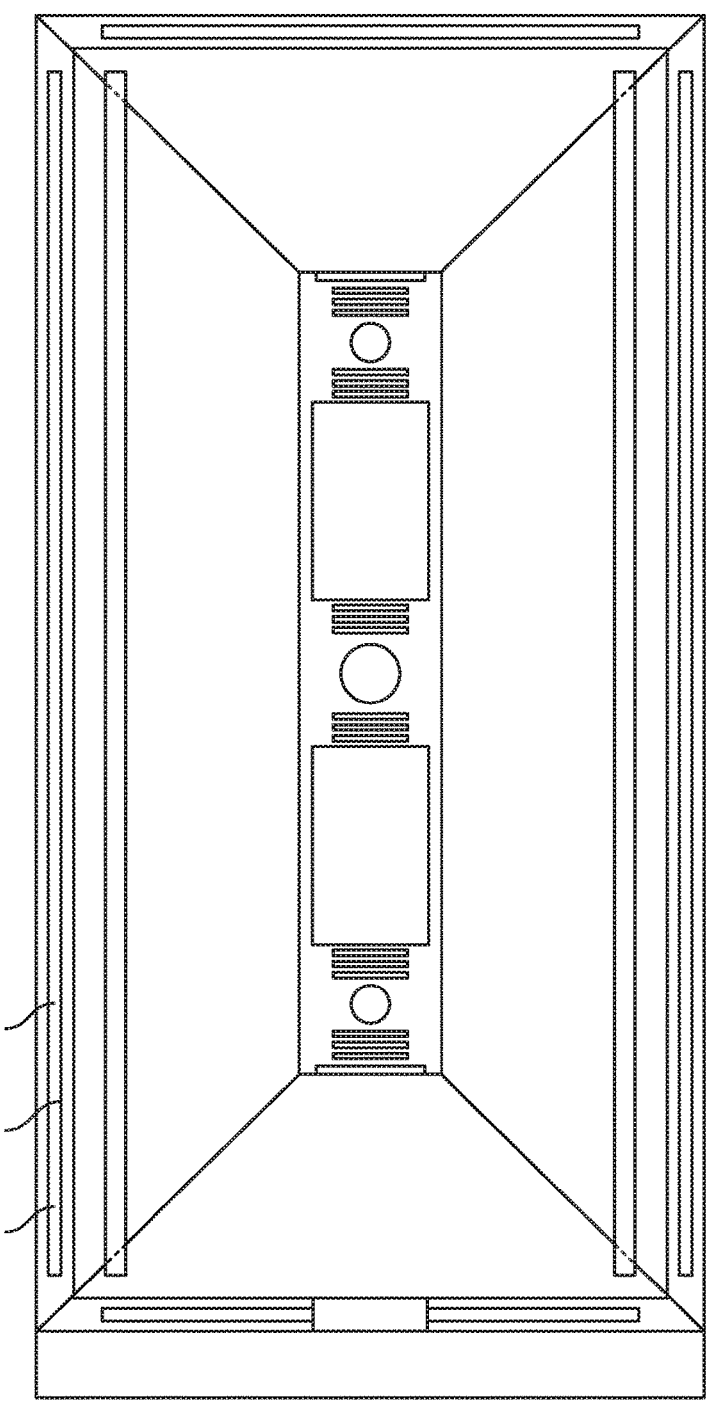
FIG. 11 is a bottom plan view of the version shown in FIG. 1.
Figure 12:
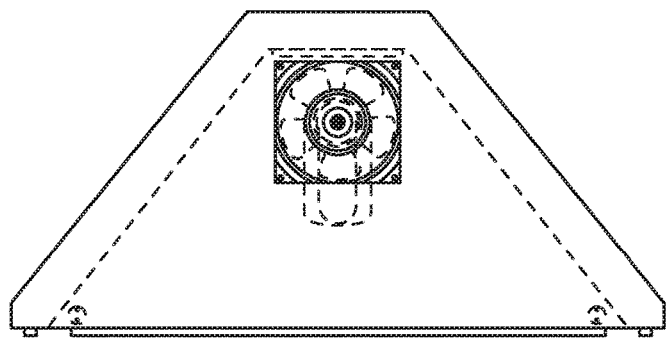
FIG. 12 is a right-side view of the version shown in FIG. 1.

In the version, a plurality of distinct strips of red 108, white 110, and blue 112 LED lights are positioned along the lower lighting perimeter 134. Throughout operation the red 108, white 110, and blue 112 LEDs are utilized to simulate both sunrise and sunset. In a detailed version as best illustrated by FIG. 9, the red spectrum of LED lights are positioned in strips along each lower lighting perimeter 134 that are unique and aligned with the four cardinal directions, namely, providing opposing northern 108N and southern 108S strips and opposing eastern 108E and western 108W strips of LED lighting.

It is known that LED may also be positioned at the upper lighting region 136, but is ideal that the LED's are positioned away from the fluorescent 104 and high intensity discharge bulbs 106 due to the propensity to overheat the LED's.

Figure 13:
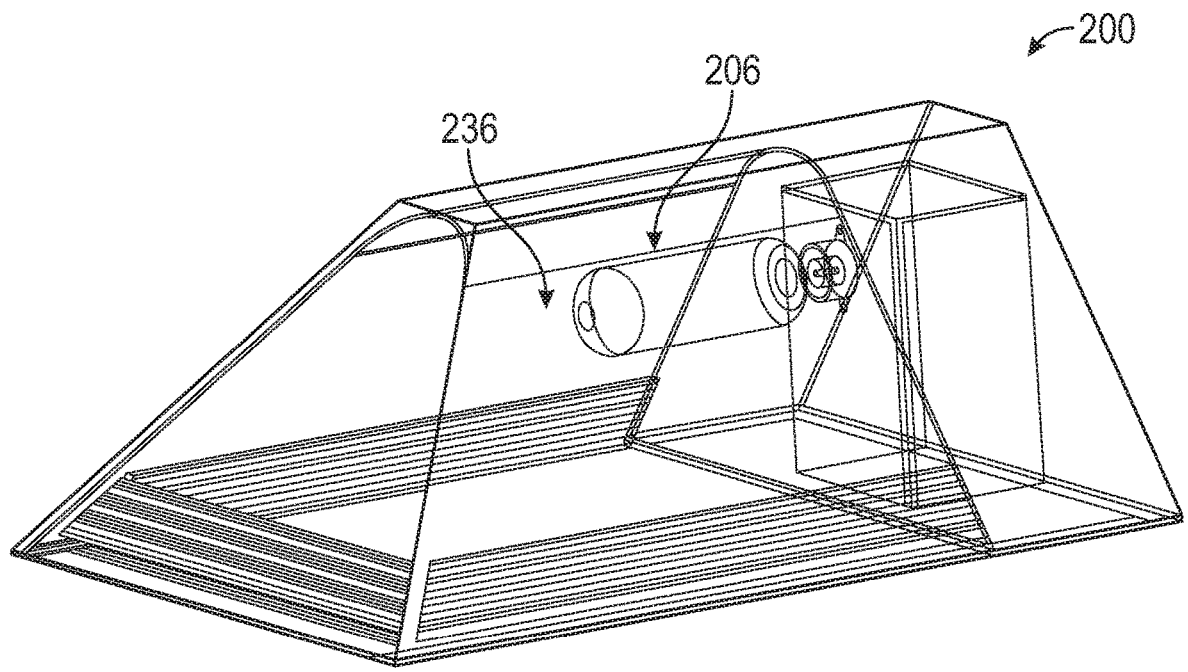
FIG. 13 is a front perspective view of a second version of the application.
Figure 14:
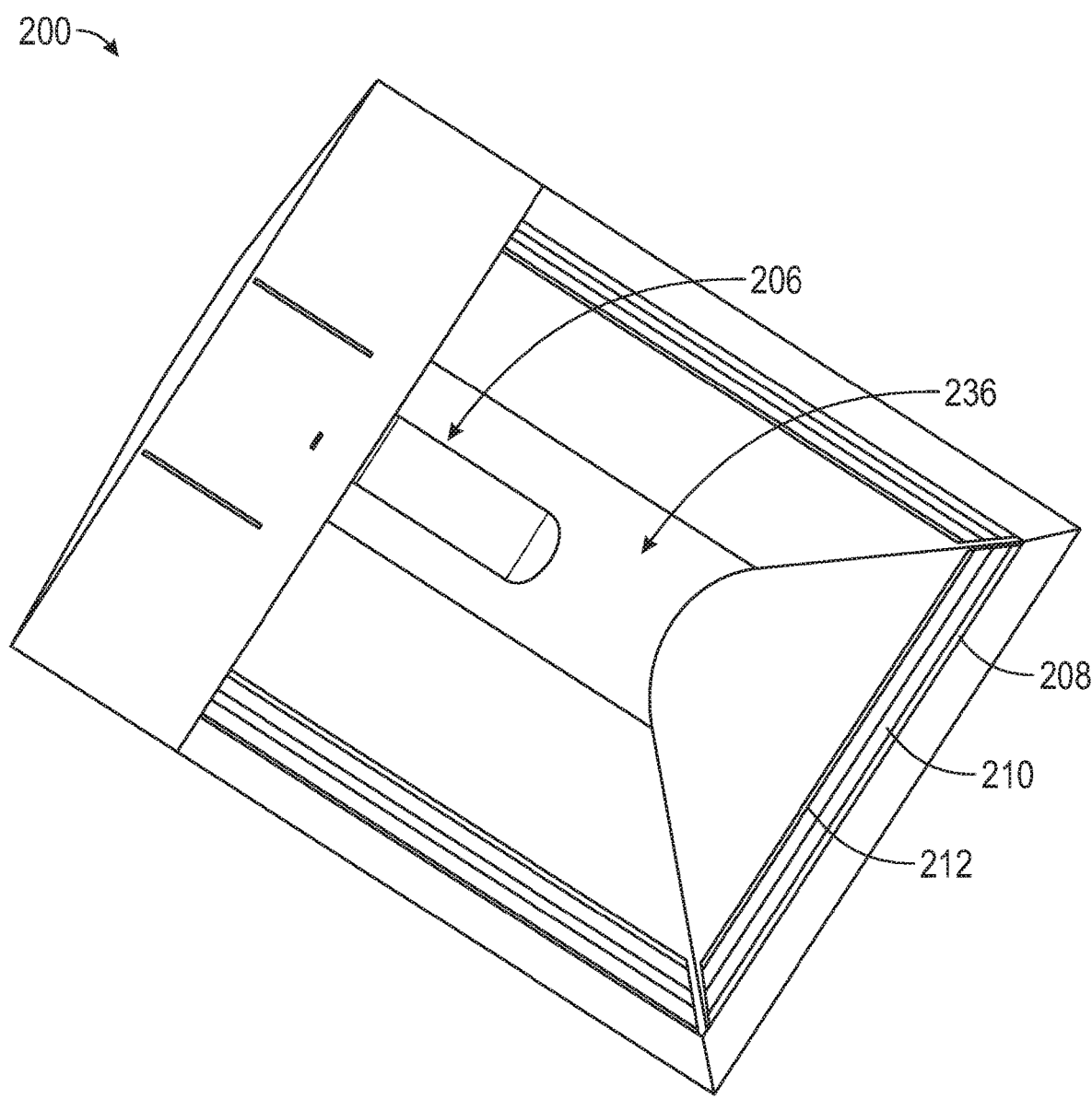
FIG. 14 is a bottom perspective view of the version shown in FIG. 13.
Figure 15A:
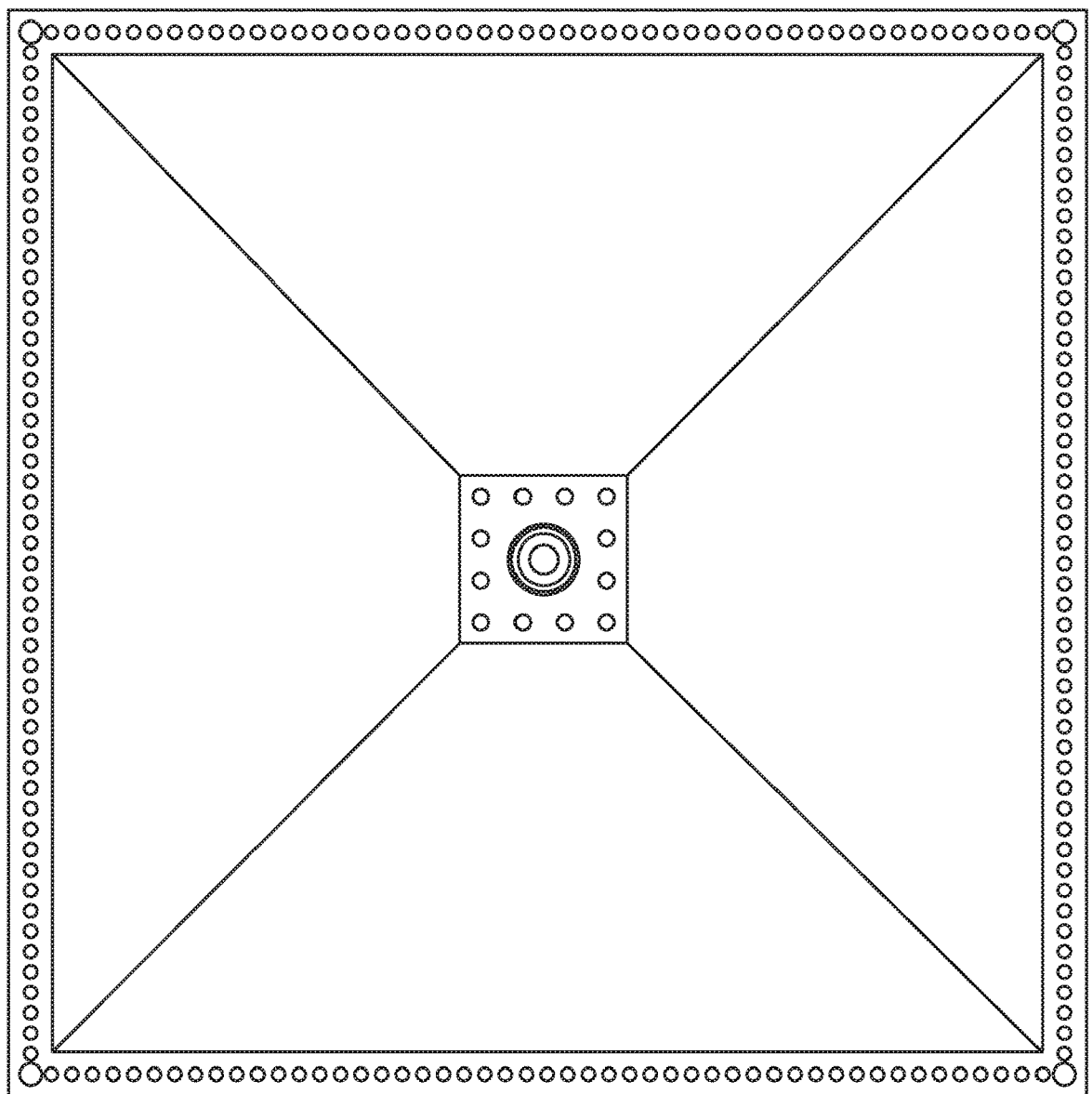
FIG. 15 is a bottom perspective view of a third version of the application.
Figure 15B:
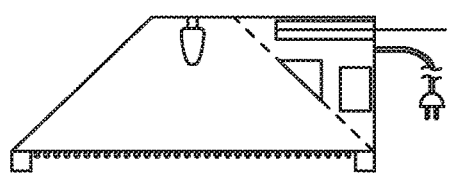
Figure 15C:
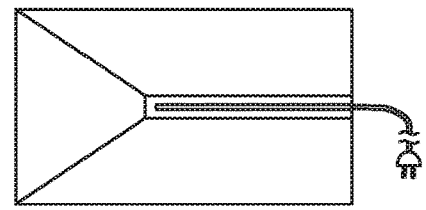
Figure 16:
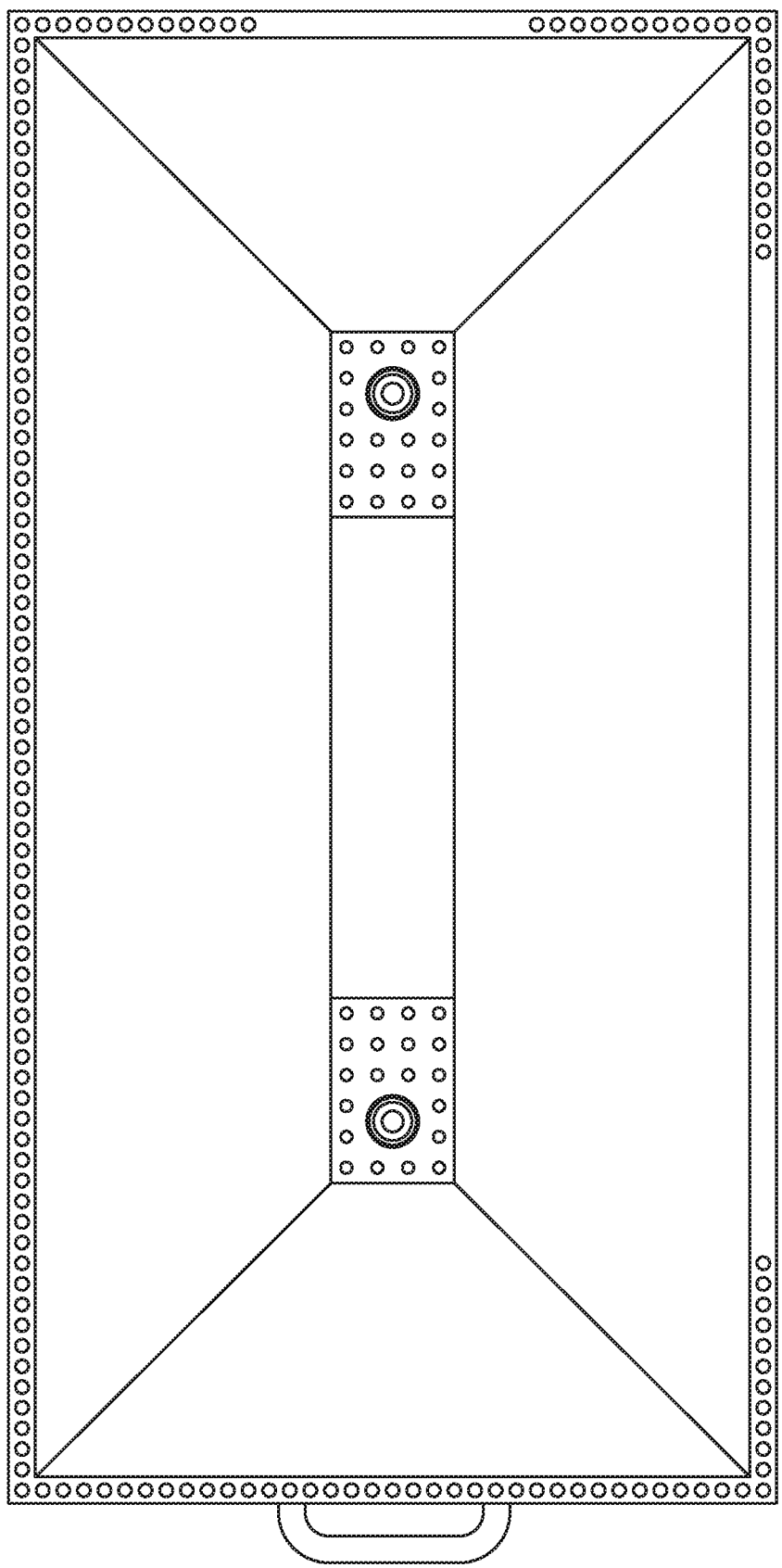
FIG. 16 is a bottom view of a fourth version of the application.
Figure 17:
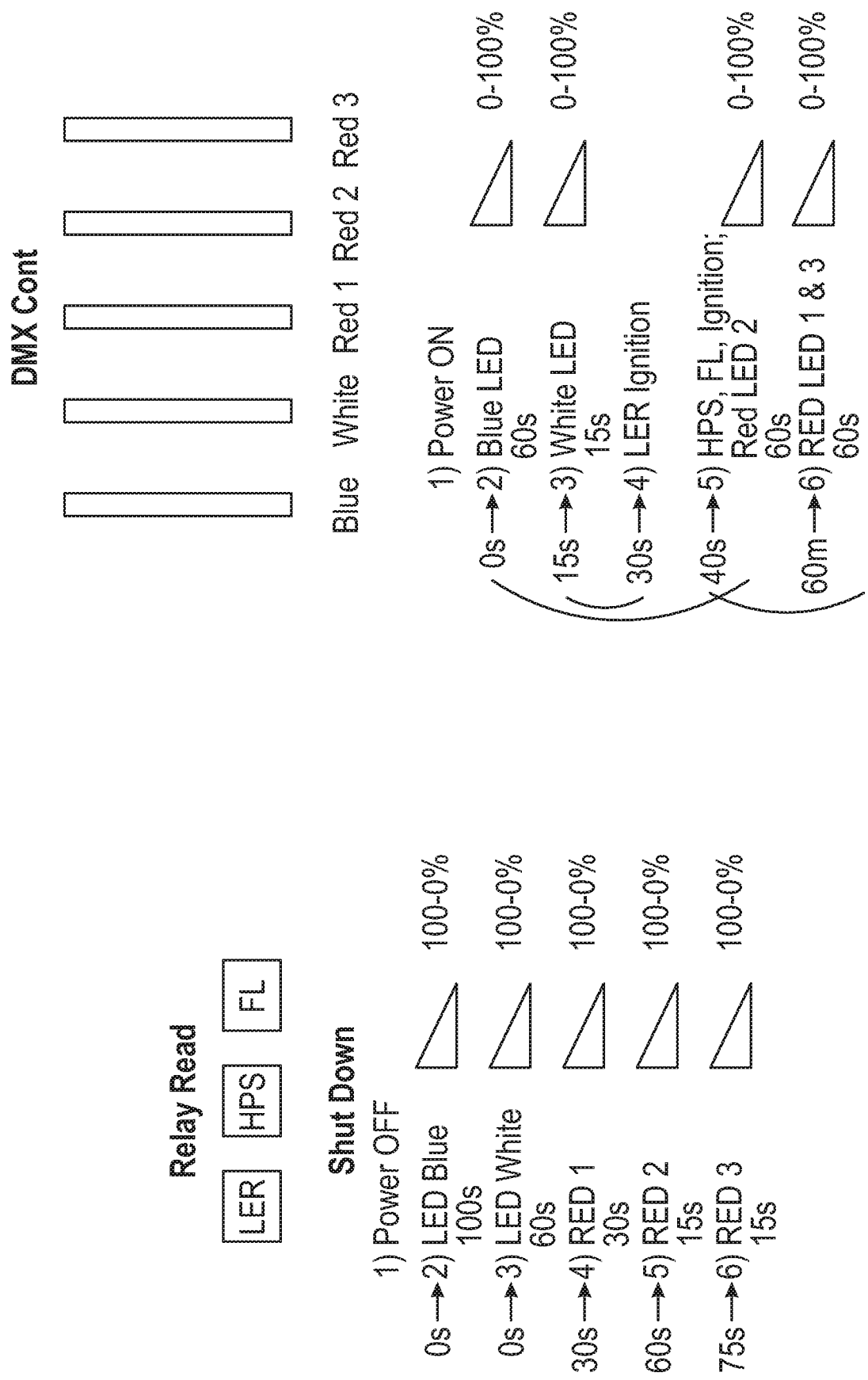
FIG. 17 is a chart illustrating a version of a method implemented by the system.

FIG. 13 and FIG. 14 illustrate a second version 200 of the light system which only utilizes a single high intensity bulb 206 positioned at an upper lighting region 236 similar to the previous discussed version. This version does not utilize fluorescent bulbs. In the version, the red 208, white 210, and blue 212 are positioned in strips along the lower lighting perimeter 234 along three sides forming a U pattern about the recessed interior space. The first version 100 can also provide this combination of LED's at the lower lighting perimeter 134.

The light system 100 comprises an on-board computer 122 which acts as the brain center of the light system 100, 200, managing and operating every aspect of the system throughout the lighting cycle, controlling and activating lights in a predetermined sequential pattern in order to simulate sunrise, sunset, and daylight spectrums of light, fading lights accordingly. In some versions, the on-board computer 122 comprises a processor 142 and non-transitory computer readable storage media 144 which is encoded with a computer program including instructions executable by the processors 142 to create a system comprising software modules configured to simulate the lighting spectrum of a sunrise; a software module configured to simulate daytime lighting spectrum; and a software module configured to simulate the lighting spectrum of a sunset.

Figure 18:
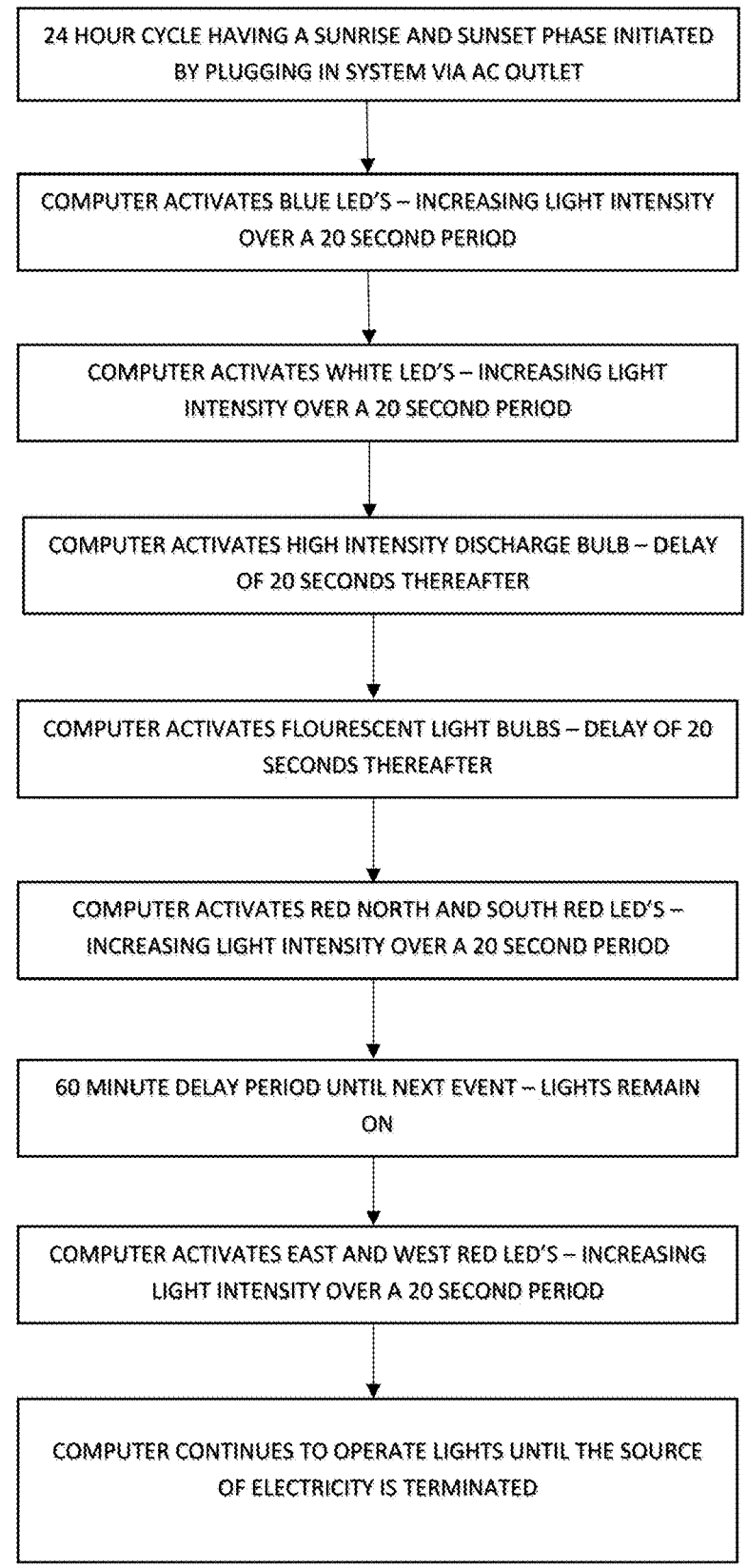
FIG. 18 is a flow chart illustrating the steps of the Sunrise Phase.

In a version of the software module, the computer is configured to simulate the lighting spectrum of a sunrise (FIG. 18), which places emphasis on the blue light spectrum. For example, the computer 122 controls the following lighting sequence in order to simulate sunrise to daylight light spectrum: (a) system 100 is powered on by providing a source of electricity 116 (plug in to AC outlet); (b) computer 122 activates blue LED's 112 by increasing light intensity over a 20 second period until fully activated; (c) computer 122 activates white LED's 110 by increasing light intensity over a 20 second period until fully activated; (d) computer 122 activates high intensity discharge bulb 106 providing a 20 second delay after the bulb is fully activated; (e) computer 122 activates one or more fluorescent bulbs 104 providing a 20 second delay after the bulb is fully activated; (f) computer 122 activates northern and southern red LED's 108N, 108S by increasing light intensity over a 20 second period until fully activated; (g) computer 122 operates to maintain current light activation for approximately 60 minutes; (h) computer 122 activates eastern and southern red LED's 108E, 108W by increasing the light intensity over a 20 second period until fully activated; and (i) lights remain operational simulating daylight light spectrum until primary source of electricity 116 (120 volt is terminated) is terminated.

In a version of another software module (FIG. 19), the computer 122 is configured to simulate the lighting spectrum of a sunset, which places emphasis on the red light spectrum. For example, the computer 122 is instructed to perform the following lighting sequence in order to simulate the shifting light spectrum throughout sunset: (a) the primary electrical power source 116 is discontinued, terminating operation of high intensity bulbs 106 and fluorescent bulbs 104; (b) system 100 including LED are now operated by way of battery 118 power; (c) computer 122 deactivates blue LED's 112 by decreasing light intensity over a 20 second period until lights are off; (d) computer 122 deactivates white LED's 110 by decreasing light intensity over a 20 second period until lights are off; (e) computer 122 deactivates eastern red LED's 108E by decreasing light intensity over a 20 second period until lights are off; f) computer 122 deactivates northern and southern red LED's 108N, 108S by decreasing light intensity over a 20 second period until the lights are off; (g) computer 122 deactivates western red LED's 108W by decreasing light intensity over a 20 second period until lights are off; and (h) lights remain off until primary electrical power source 116 is restored initiating the sunrise phase.

Other software modules that fade the sequence of LED's and other lights can certainly be envisioned. Moreover, the activating and deactivating by way of increasing and decreasing light intensity of each colored group red, white, and blue may vary in timing, duration and overlap in order to form certain lighting outputs spectrums ideal for a particular type of plant. Thus, the invention should not be strictly limited to the example sunrise and sunset methodology described above and should not be limited to the colors of only red, white, and blue.

Although preferred versions of the environmental network 100 have been described in considerable detail, other versions of the invention are possible.

All features disclosed in the specification (including and accompanying claims, abstract, and drawings) may be replaced by alternative features serving the same, equivalent or similar purpose unless expressly stated otherwise. Thus, unless stated otherwise, each feature disclosed is one example only of a generic series of equivalent or similar features.

What is claimed is:

1. A light system for providing a light for cultivating plants, the system comprising:
   a) a lighting hood assembly structure for supporting components of the system, wherein the hood assembly structure comprises:
      i) a recessed interior space having an upper lighting region and a lower lighting perimeter positioned lower and lateral relative to the upper lighting surface; and
      ii) wherein the recessed interior space comprises a reflective material angled downward between the upper lighting region and lower lighting surfaces;
   b) one or more fluorescent bulbs operably positioned within the recessed space;
   c) one or more high intensity discharge bulbs positioned at the upper lighting surface;
   d) a plurality of red LED lights lined about the lower lighting perimeter, wherein the red LED's are oriented in opposing northern and southern strips and opposing eastern and western strips forming a rectangular pattern;
   e) a plurality of white LED lights lined about the lower lighting perimeter;
   f) a plurality of blue LED lights lined about the lower lighting perimeter;
   g) a fan operably positioned within a side wall of the lighting hood for removing heat from the recessed interior;
   h) a primary electrical power source providing 120-volt electrical power;
   i) a battery operably configured to power the LED lights;
   j) a battery charger which is operably configured to charge battery by way of primary electrical source;
   k) an on-board computer configured to operate and control a lighting sequence of the lights in a coordinated manner, the computer comprising a computer processor and non-transitory computer readable storage media encoded with a computer program including instructions executable by the computer processor to create a computer application comprising:
      i) a software module configured to simulate the lighting spectrum of a sunrise;

ii) a software module configured to simulate daytime lighting spectrum; and iii) a software module configured to simulate the lighting spectrum of a sunset.

2. The according to claim 1, wherein the software module configured to simulate the lighting spectrum of a sunrise provides the following lighting sequence:
   a) system is powered on by providing a source of electricity;
   b) computer activates blue LED's by increasing light intensity over a 20 second period until fully activated;
   c) computer activates white LED's by increasing light intensity over a 20 second period until fully activated;
   d) computer activates high intensity discharge bulb providing a 20 second delay after the bulb is fully activated;
   e) computer activates one or more fluorescent bulbs providing a 20 second delay after the bulb is fully activated;
   f) computer activates northern and southern red LED's by increasing light intensity over a 20 second period until fully activated;
   g) computer operates to maintain current light activation for approximately 60 minutes;
   h) computer activates eastern and southern red LED's by increasing the light intensity over a 20 second period until fully activated; and
   i) lights remain operational until source of electricity is terminated.

3. The according to claim 1, wherein the software module configured to simulate the lighting spectrum of a sunset provides the following lighting sequence:
   a) primary electrical power source is discontinued, terminating operation of high intensity bulbs and fluorescent bulbs;
   b) system is operated by way of battery power;
   c) computer deactivates blue LED's by decreasing light intensity over a 20 second period until lights are off;
   d) computer deactivates white LED's by decreasing light intensity over a 20 second period until lights are off;
   e) computer deactivates eastern red LED's by decreasing light intensity over a 20 second period until lights are off;
   f) computer deactivates northern and southern red LED's by decreasing light intensity over a 20 second period until the lights are off;
   g) computer deactivates western red LED's by decreasing light intensity over a 20 second period until lights are off; and
   h) lights remain off until primary electrical power source is restored initiating the sunrise phase.

* * * * *